United States Patent [19]

Osborn et al.

[11] Patent Number: 4,618,635

[45] Date of Patent: Oct. 21, 1986

[54] COATING COMPOSITIONS PREPARED FROM LACTONE-ACRYLATE ADDUCT, POLYOL AND ISOCYANATE

[75] Inventors: Claiborn L. Osborn; Joseph V. Koleske; Kenneth Drake, all of Charleston, W. Va.

[73] Assignee: Union Carbide Corporation, Danbury, Conn.

[21] Appl. No.: 735,096

[22] Filed: May 17, 1985

Related U.S. Application Data

[63] Continuation-in-part of Ser. No. 509,389, Jun. 30, 1983, abandoned.

[51] Int. Cl.$^4$ ............................................. C08L 75/00

[52] U.S. Cl. ....................................... 524/113; 524/317; 524/360; 524/361; 524/590; 524/751; 524/759; 524/770; 524/771; 524/875; 528/49; 528/75

[58] Field of Search ............... 524/113, 317, 360, 361, 524/590, 751, 759, 770, 771, 875; 528/49, 75

[56] References Cited

U.S. PATENT DOCUMENTS 3,700,643 10/1972 Smith et al. ........................ 528/282
4,188,472 2/1980 Chang ................................. 528/75

Primary Examiner—Maurice J. Welsh
Attorney, Agent, or Firm—Jean B. Mauro

[57] ABSTRACT

Described herein are compositions comprising the reaction product of a polyol, a multi-functional isocyanate, a lactone-acrylate adduct and an hydroxyalkyl acrylate. These compositions are suitable for use as curable coatings.

28 Claims, No Drawings

COATING COMPOSITIONS PREPARED FROM LACTONE-ACRYLATE ADDUCT, POLYOL AND ISOCYANATE

BACKGROUND OF THE INVENTION

This Application is a continuation in part of U.S. patent application Ser. No. 509,389 filed on June 30, 1983 now abandoned.

This invention is directed to a composition comprising the reaction product of a polyol, a multi-functional isocyanate, a lactone-acrylate adduct and, optionally, an hydroxyalkyl acrylate. These compositions are suitable for use as curable coatings.

U.S. Pat. No. 3,700,643 (Re. 29,131) describes coating compositions. These coating compositions contain a reaction product oF a polycaprolactone polyol and acrylic acid or polycaprolactone polyol, an organic isocyanate and hydroxyalkyl acrylate. The patent states that polycaprolactone polyols that contain at least one free hydroxyl group react with acrylic acid to produce an acrylate-capped polycaprolactone derivative. Also, an organic polyisocyanate can be reacted with an hydroxyalkyl acrylate and a polycaprolactone polyol to produce an acrylate-capped polycaprolactone urethane. The patent states that these compounds can be used per se as coating compositions or they can be admixed with other compounds to produce coating compositions.

U.S. Pat. No. 4,188,472 describes lactone derived resins formed by reacting a lactone with an ester containing acrylyl or alpha-substituted acrylyl groups and one or two hydroxyl groups and reacting the product so formed with an isocyanate. The coating compositions are described as having low viscosity and used for in-mold coating operations as well as for operations where an UV-cure is desirable.

However, it is desirable that the composition employed in a radiation curable coating composition have a sufficiently low viscosity so that it can be easily applied to a substrate using conventional coating techniques without the excessive use of diluents. Also, such a coating composition should impart good physical properties to a cured coating. Prior art compositions lack the combination of low viscosity, high tensile strength and good extensibility.

THE INVENTION

It has now been found that a composition comprising the reaction product of a polyol, a multi-functional isocyanate, a lactone-acrylate adduct and, optionally, an hydroxyalkyl acrylate is suitable for use as a radiation curable coating composition. This composition exhibits desirably low viscosity, and at the same time, imparts good physical properties to the radiation cured coating.

Substantially any of the organic polyols previously used in the art to make coating compositions can be used in this invention. Illustrative of the polyols useful in producing coating compositions in accordance with this invention are the polyether polyols such as polyhydroxyalkanes and polyoxyalkylene polyols, the acrylic and vinyl polyols, the polyester polyols, the polycaprolactone polyols and other lactone polyols such as polyvalerolactone polyols, poly-methyl-caprolactone polyols, etc., the polymer/polyols, and the like. Among the polyether polyols which can be employed are those selected from one or more of the following classes of compositions, alone or in admixture, known to those skilled in the art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyether polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

The alkylene oxide adducts of phosphorus and polyphosphorus acids are another useful class of polyether polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A still further useful class of polyether polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2, -tetrakis(hydroxyphenol) ethanes, and the like.

The polyols described hereinabove can have hydroxyl numbers which vary over a wide range. In general, the hydroxyl numbers of the above described polyols employed in this invention can range from about 15, and lower, to about 900, and higher. The hydroxyl number is defined as the number of milligrams of potassium hydroxide required for the complete neutralization of the fully phthalated derivative prepared from 1 gram of polyol. The hydroxyl number can also be defined by the equation:

$$OH = [(56.1 \times 1000 \times f)/m.w.]$$

where
- OH=hydroxyl number of the polyol;
- f=functionality, that is, average number of hydroxyl groups per molecule of polyol; and
- m.w.=molecular weight of the polyol.

The polyether polyols described hereinabove can be prepared by conventional methods and are commercially available from a number of manufacturers.

The polycaprolactone polyols, alone or in admixture, that can be used to prepare the coating compositions of this invention include any of the known polycaprolactone polyols that are commercially available and that are fully described, For example, in U.S. Pat. No. 3,169,945. As described in this patent the polycaprolactone polyols are produced by the ring-opening polymerization of an excess of a caprolactone and an organic polyfunctional initiator having at least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, neopentyl lycol, 1,4-cyclohexanedimethanol, 2,4,4-trimethyl-pentanediol, 2,2-dimethyl-3-hydroxy-propyl, 2,2-dimethyl-3-hydroxypropionate, and similar polyalkylene glycols, either blocked, capped or heteric, containing up to about 40 or more alkyleneoxy units in the molecule, 3-methyl-1-5-pentanediol, cyclohexanediol, 4,4′-methylene-biscyclohexanol, 4,4′-isopropylidene bis-cyclohexanol, xylenediol, 2-(4-hydroxymethylphenyl) ethanol, 1,4-butanediol, 1,6-hexanediol and the like; triols such as glycerol, trimethylolpropane, 1,2,6-hexanetriol, triethanolamine, triisopropanolamine, and the like; tetrols such as erythritol, pentaerythritol, N,N,N′,N′-tetrakis(2-hydroxyethyl)ethylene diamine, and the like.

When the organic functional initiator is reacted with the caprolactone a reaction occurs that can be represented in its simplest form by the equation:

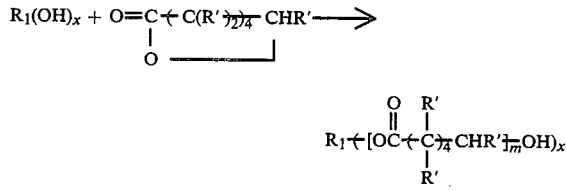

In this equation the organic functional initiator is the $R_1(OH)_x$ compound and the caprolactone is the

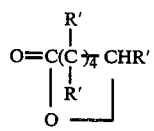

compound; this can be epsilon-caprolactone itself or a substituted caprolactone wherein R′ is an alkyl, alkoxy, aryl, cycloalkyl, alkaryl or aralkyl group having up to twelve carbon atoms and wherein at least six of the R′ groups are hydrogen atoms, as shown in U.S. Pat. No. 3,169,945. The polycaprolactone polyols that are used are shown by the formula on the right hand side of the equation; they can have an average molecular weight of from 200 to about 6,000. The preferred polycaprolactone polyol compounds are those having an average molecular weight of from about 290 to about 6,000, most preferably from about 290 to 3,000. The most preferred are the polycaprolactone diol compounds having an average molecular weight of from about 290 to about 1,500 and the polycaprolactone triol and tetrol compounds having an average molecular weight of from about 290 to about 3,000. In the formula m is an integer representing the average number of repeating units needed to produce the compound having said molecular weights. The hydroxyl number of the polycaprolactone polyol can be from about 15 to 600, preferably from 200 to 500; and the polycaprolactone can have an average of from 2 to 8, preferably 2 to 4, hydroxyl groups.

Illustrative of polycaprolactone polyols that can be used in the coating compositions of this invention, one can mention the reaction products of a polyhydroxyl compound having an average from 2 to 6 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compounds; this figure is shown in the third column.

| POLYCAPROLACTONE POLYOLS | | |
|---|---|---|
| Initiator | Average MW of polyol | Average No. of CPL units in molecules |
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalene glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,398 | 7 |
| 15 Polyethylene glycol (MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 835 | 3.6 |
| 20 Polypropylene glycol (MW 1000)* | 1,684 | 6 |
| 21 Polypropylene glycol (MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4 |
| 28 1,2,6-Hexanetriol | 476 | 3 |
| 29 Trimethylolpropane | 590 | 4 |
| 30 Trimethylolpropane | 750 | 5.4 |
| 31 Trimethylolpropane | 1,103 | 8.5 |
| 32 Triethanolamine | 890 | 6.5 |
| 33 Erythritol | 920 | 7 |
| 34 Pentaerythritol | 1,219 | 9.5 |
| 35 1,4-Butanediol | 546 | 4.0 |

-continued

| POLYCAPROLACTONE POLYOLS | | |
|---|---|---|
| Initiator | Average MW of polyol | Average No. of CPL units in molecules |
| 36 Neopentyl glycol | 674 | 5.0 |

*Average molecular weight of glycol.

The structures of the compounds in the above tabulation are obvious to one skilled in the art based on the information given. The structure of compound No. 7 is idealized as:

wherein the variable r is an integer, the sum of r+r has an average value of 3.7 and the average molecular weight is 527. The structure of compound No. 20 is idealized as:

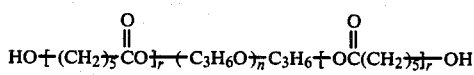

wherein the sum of r+r has an average value of 6 and the average molecular weight is 1,684. This explanation makes explicit the structural formulas of compounds 1 to 34 set forth above.

Polycaprolactone hexols suitable for use in the present invention can be prepared by the catalytic polymerization of an excess of polycaprolactone polyols and a cycloaliphatic epoxide. Illustrative polycaprolactone polyols useful in the preparation of polycaprolactone hexols include polycaprolactone diols, polycaprolactone triols and the like including mixtures thereof. Many of these polycaprolactone polyols are commercially available from Union Carbide Corporation. Cycloaliphatic epoxides suitable for use in preparing the polycaprolactone hexols include 3,4-epoxycyclohexylmethyl-3,4-epoxycyclohexane carboxylate, bis (3,4-epoxycyclohexylmethyl) adipate, vinyl cyclohexene dioxide and the like. Many of these cycloaliphatic epoxides are commercially available from Union Carbide Corporation. A suitable polymerization catalyst is diethylammonium triflate which is commercially available from the 3M Company as FC-520.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to a nil or almost a nil value. A modicication of this process can involve initially adding all of the ingredients into the reactor. A further modification of this method can involve a vacuum treatment of from 10 to 30 minutes after the catalyst addition and/or the use of a vacuum during the heating of the polycaprolatone triols to a molten state. Preferred polycaprolactone hexols suitable as ingredients in the coating compositions of this invention have an average molecular weight of from about 600 to about 1500.

The polymer/polyols that can be used to prepare the coating compositions of this invention are known materials. Such polymer/polyols can be produced by polymerizing one or more ethylenically unsaturated monomers dissolved or dispersed in a base polyol in the presence of a free radical catalyst. The production of polymer/polyols is more fully described in U.S. Pat. No. Re. 28,715, U.S. Pat. No. Re. 29,118, U.S. Pat. No. 3,652,639, U.S. Pat. No. Re. 29,014, U.S. Pat. Nos. 3,950,317, 4,208,314, 4,104,236, 4,172,825 and 4,198,488.

While poly(oxypropylene) polyols are preferred, substantially any of the polyols previously used in the art to make polymer/polyols can be used as the base polyol. Illustrative of the base polyols useful in producing polymer/polyol compositions are the polyether polyols such as polyhydroxyalkanes and polyoxyalkylene polyols, or the like. Among the base polyols which can be employed are those selected from one or more of the following classes of compositions, alone or in admixture, known to those skilled in the art and described more fully hereinabove:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like. The most preferred base polyols employed in the polymer/polyols which are useful as ingredients in the coating compositions of this invention include the poly(oxypropylene) polyols. It should be appreciated that a blend or mixture of more than one base polyol can be utilized, is desired, to form the polymer/polyol.

Conceptually, the monomers used in preparing the polymer/polyols can comprise any ethylenically unsaturated monomer or monomers. A variety of monomers are disclosed in the patents relating to polymer/polyols previously referred to. The selection of the monomer or monomers used will depend on considerations such as the relative cost of the monomers and the product characteristics required for the intended application.

The preferred monomer and monomer mixture used to make the polymer portion of the polymer/polyols is acrylonitrile and a mixture of acrylonitrile and styrene respectively. The relative weight proportions of acrylonitrile to styrene can range from about 80:20 to about 20:80. It may be desirable in some applications to utilize, with acrylonitrile, a comonomer other than styrene. Representative examples of suitable comonomers include methyl methacrylate, vinyl chloride and vinylidene chloride.

The polymer and polyol content of the polymer/polyols can vary within wide limits, depending upon the requirements of the anticipated end use application. In general, the polymer content will vary from about 10 to about 50 percent, based upon the weight of the polymer/polyol. The polyol content of the polymer/polyols varies from about 50 to about 90 percent, based upon the weight of the polymer/polyol.

The polymer/polyols may, if desired, be blended with other conventional polyols described hereinabove to reduce the polymer content to the level desirable for the particular end use application. Blends in which the resulting polymer content is as low as 4 percent of the total weight of the blend or even less may be useful in the coating compositions of this invention.

A preferred classes of polyols employed in the coating compositions of this invention are the polycaprolactone polyols such as TONE-0200 and TONE-0305 commercially available from Union Carbide Corporation, the dihydroxyl functional polytetramethylene oxide polyols such as Polymeg 650, 1000 and 2000 commercially available from Quaker Oats Company, the polymer/polyols such as NIAX polymer polyol 31-23 and 34-28 commercially available from Union Carbide Corporation, and of course the ethylene oxide and propylene oxide adducts including ethylene glycol, diethylene glycol, the poly(oxyethylene) glycols, the poly(oxypropylene) glycols, triols and higher functionality polyols such as LHT-67, LHT-112, and LG-56 commercially available from Union Carbide Corporation. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, such as the propylene oxide polyols capped with ethylene oxide, i.e., NIAX Polyol 11-27 and 11-34 and E-474, commercially available from Union Carbide Corporation, or may be randomly distributed along the polymer chain. As is well known in the art, the polyols that are most preferred herein contain varying small amounts of unsaturation. Unsaturation in itself does not affect in any adverse way the formation of the coating compositions in accordance with the present invention.

Other preferred representative examples of organic polyols that may be employed in the coating compositions of this invention include copolymers of hydroxypropyl and hydroxyethyl acrylates and methacrylates with other free radically polymerizable monomers such as acrylate esters, vinyl halides, vinyl acetate or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy terminated polyesters, hydroxy terminated polyalkadienes, and styrene alkyl alcohol copolymers. The polyester polyols are the reaction products of polyfunctional organic carboxylic acids and polyhydric alcohols and include, for example, poly(hexamethylene adipate), poly(ethylene adipate), poly(butylene adipate) and the like. Many of these organic polyols can be prepared by conventional methods and are commercially available from a number of manufacturers such as polyvinylacetal resins commercially available from Monsanto Chemical Company as Butvar B-72A, B-73, B-76, B-90 and B-98 and as Formvar 7/70, 12/85, 7/95S, 7/95E, 15/95S and 15/95E; an aliphatic polyester diol commercially available from Rohm and Haas as Paraplex U-148; saturated polyester polyols commercially available from Mobay Chemical Company as Multron R-2, R-12A, R-16, R-18, R-38, R-68, and R-74; a hydroxypropylated cellulose having an equivalent weight of approximately 100 commercially available from Hercules, Inc. as Klucel E; and a cellulose acetate butyrate ester having a hydroxyl equivalent weight of approximately 400 commercially available from Eastman Kodak as Alcohol Soluble Butyrate.

Another preferred class of polyols utilized in this invention are polyester polyols as described in U.S. patent application Ser. No. 469,433 filed in the name of L. A. Domeier et al on Feb. 24, 1983, titled "Polyester Polyols Based On Lactones" and assigned to the same assignee as this application.

The polyester polyols as described in said application has a molecular weight of less than about 3000 and is produced from the ring opening reaction of a lactone with a polyfunctional initiator, wherein the minimum percent of lactone hydroxyls, y, (i.e. those hydroxyls attached to an open lactone) in the polyester polyols is a function of the mole ratio, x, of lactone units to active hydrogens in the initiator and can be defined as $y = 52.5x$ for $x < 0$ to 1.5 and $y = 2.11x + 75.6$ for $x < 1.5$.

The polyester polyols are prepared by the ring opening reaction of a lactone with a polyfunctional initiator. The preferred lactone is ε-caprolactone. The initiators are of the formula $$A(BH)_a$$

in which A is an organic radical selected from the group consisting of aliphatic, cycloaliphatic, aromatic and heterocyclic radicals, a is a number equal to the functionality of the initiator, and the B is selected from —O—, —NH—, —NR²— (R² is selected from alkyl, aryl, aralkyl or cycloalkyl), —S—, and —C(O)O—.

The type of BH groups in a single initiator may be identical or may vary as in aminoalcohols, hydroxycarboxylic acids, and the like.

Preferred initators are organic polyols in which the BH groups are hydroxyl groups.

The molecular weight (number average, Mn) of the polyol product is less than about 3000, and preferably less than about 1500.

The reaction of the lactone and the polyfunctional initiator is preferably carried out in the presence of a catalyst.

The catalysts which may be used include one or more organometallic compounds and other metallic compounds such as stannous chloride and other Lewis and protonic acids. Preferred catalysts include stannous octanoate, dibutyltin dilaurate, and other tin compounds; titanates such as tetraisopropyl titanate and butyl titanate; and the like. Any of the catalysts commonly used in ring-opening polymerizations of lactones may be used in the practice of this invention.

The catalyst is used in conventional amounts of from about 0.1 to 50 parts per million based on the total weight of the lactone.

The reaction may be effected in a solvent which must be free of active hydrogen groups such as hydrocarbon solvents. The reaction is preferably carried out neat, in the absence of any solvent.

The reaction may be carried out at atmospheric pressure, although higher or lower pressures may be used.

The reaction is carried out at a temperature of from about 100° to about 200° C., preferably from about 140° to about 170° C. The reaction is carried out for a period of from about 1 to about 24 hours, Preferably from about 3 to about 8 hours. It is important to avoid extended reaction times and excessive reaction temperatures which lead to a gradual decrease in the percent of lactone hydroxyl groups.

The organic polyol utilized in the coating compositions of this invention can be mixtures or blends of organic polyols. For example, when utilizing a polycaprolactone polyol, it may be desirable to mix or blend one or more of a propylene oxide polyol, a propylene oxide polyol capped with ethylene oxide, a polytetramethylene oxide polyol or a polymer/polyol therewith. Other mixtures or blends may similarly be used is desired.

The multi-functional isocyanates suitable for use herein are known in the art and include the aliphatic and aromatic diisocyanates. Many such compounds ar known to those skilled in the art and illustrative thereof one can mention 2,4-tolylene diisocyanate, 2,6-tolylene diisocyanate, isophorone diisocyanate, 4,4'-diphenylmethane diisocyanate, di(2-isocyanatoethyl)-bicyclo (2.2.1) hept-5-ene-2,3-dicarboxylate, 3,5,5-triethyl-1-isocyanato-3-isocyanato-methylcyclohexane, 1,6-hexamethylene diisocyanate, m- and p-xylene diisocyanate, cyclohexane-1,4-diisocyanate, dicyclohexyl-4,4'-methane diisocyanate, tetramethylene diisocyanate, cyclopentylene-1,3-diisocyanate, 1,3-diisocyanate, 1,4-xylylene diisocyanate, 1,5-naphthalene diisocyanate, m-phenylene diisocyanate, p-phenylene diisocyanate, hexamethylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, 3,3'-dimethoxy-4,4'-dimethyl-4,4'-biphenylene diisocyante, durene diisocyanate, 1-phenoxy-2,4-phenylene diisocyanate, 1-tert-butyl-2,4-phenylene diisocyanate, 2,2,4-trimethylhexamethylene diisocyanate, 1,3,5-benzene triisocyanate, 2,4,6-toluene triisocyanate, and the like, or mixtures thereof.

The lactone-acrylate adduct that is suitable for use in this invention is prepared by reacting a lactone with an hydroxyalkyl acrylate.

The lactones suitable for use in preparing the lactone-acrylate adduct of this invention are characterized by the following formula:

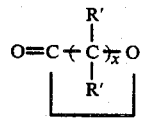

wherein the R''s are independently hydrogen or alxyl or from 1 to 12 carbon atoms, and x is from 4 to 7. The preferred lactone is epsilon-caprolactone.

The hydroxyalkyl acrylates include 2-hydroxyethyl acrylate, hydroxypropyl acrylate, hydroxybutyl acrylate, 2-hydroxy-3-chloro-propyl acrylate, 2,3-dihydroxy propyl acrylate, and the like, or mixtures thereof. Hydroxyethyl acrylate is preferred. Minor amounts of hydroxyalkyl methacrylate may also be included.

The lactone-acrylate adduct is prepared by reacting the lactone with the hydroxyalkyl acrylate in the presence of less than about 200 parts per million of a catalyst. The catalyst which may be used includes one or more organometallic compounds and other metallic compounds such as stannic chloride or ferric chloride and other Lewis and protonic acids. Preferred catalysts include stannous octonoate, dibutyltin dilaurate, and other tin compounds; titanates such as tetraisopropyl titantate and butyl titanate; and the like.

The reaction is carried out at a temperature of from about 100° to about 140° C., preferably from about 120° to about 130° C. The reaction may be carried out at atmospheric pressure, although higher or lower pressures may be used. The reaction is generally carried out in the presence of oxygen to inhibit polymerization of the hydroxyalkyl acrylate. The reaction is carried out for a period of from about 2 to about 20, preferably from about 3 to about 11 hours. The reaction is carried out in the presence of a suitable inhibitor to prevent polymerization of the hydroxyalkyl acrylate double bond. These inhibitors include the monomethyl ether of hydroquinone, benzoquinone, phenothiazine, methylhydroquinone, 2,5-di-t-butylquinone, hydroquinone, and other common free radical inhibitors known in the art. The level of inhibitor used in less than 1000 parts per million and preferably less than 800 parts per million. The hydroxyalkyl acrylate component of this invention is selected from those described above, with hydroxyethyl acrylate being preferred.

The lactone acrylate adduct contains from one to about 10 moles of lactone per mole of hydroxyalkyl acrylate.

The compositions of this invention may be prepared by adding the components in a number of different ways. For example, the polyol, multi-functional isocyanate, lactone-acrylate adduct and the hydroxyalkyl acrylate may be all added together. Also, the lactone may be reacted with the hydroxyalkyl acrylate followed by addition of the multifunctional isocyanate and polyol, and, optionally more hydroxyalkyl acrylate may be added. Also, the polyol may be reacted with the multi-functional isocyanate followed by the reaction of this product with the lactone-acrylate adduct and optionally more hydroxy-alkyl acrylate and/or reactive solvents. The non-reactive solvent may be added at any point.

Preferably, the multi-functional isocyanate is reacted with the polyol followed by the reaction of that product with the lactone-acrylate adduct and, optionally additional hydroxyalkyl acrylate.

The reaction is generally carried out in the presence of a catalyst. The catalyst which may be used herein includes one or more organometallic compounds and other metallic compounds such as stannic chloride or ferric chloride and other Lewis and protonic acids. Preferred catalysts include stannous octonoate, dibutyltin dilaurate, and other tin compounds; titanates such as tetraisopropyl titanate and butyl titanate; and the like. The catalyst is used in amounts of from 0.001 to about 5 percent, and preferably from about 0.01 to about 2 percent.

The reaction is carried out at a temperature of from about 25° to about 150° C., preferably from about 40° to about 80° C. The reaction may be carried out at atmospheric pressure, although higher or lower pressures may be used. The reaction is carried out for a period of from about 1 to about 72, preferably from about 2 to about 24 hours.

The reaction is carried out in the presence of a suitable inhibitor to prevent polymerization of the hydroxyalkyl acrylate double bond. These inhibitors include those described above in the amounts described above.

The reaction may be carried out in the presence of a reactive or a conventional solvent. Suitable reactive solvents which can be employed are defined by the formula:

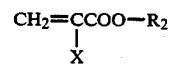

wherein X is hydrogen or methyl and $R_2$ can be substituted or unsubstituted alkyl, cycloalkyl, alkenyl, aryl, or aralkyl, wherein the substituent can be alkoxy, hydroxy, cyano, or amino, or $R_2$ can be carbamoyloxy alkyl which can be N-alkyl substituted.

Illustrative of suitable reactive solvents one can mention: mono functional alkyl acrylates having up to about 12 carbon atoms in the alkyl segment such as ethyl acrylate, butyl acrylate, 2-ethylhexyl acrylate, amyl acrylate, n-lauryl acrylate, nonyl acrylate, n-octyl acrylate, isooctyl acrylate, isodecyl acrylate, etc.; alkoxyalkyl acrylates such as methoxybutyl acrylate, ethoxyetheyl acrylate, ethoxypropyl acryate, etc.; hydroxyalkyl acrylates such as hydroxyethyl acrylate, hydroxybutyl acrylate, etc.; alkenyl acrylates such as trimethoxyallyloxymethyl acrylate, allyl acrylate, etc.; aralkyl acrylates such as phenoxyethyl acrylate, benzyl acrylate, etc.; cycloalkyl acrylates such as cyclohexyl acrylate, cyclopentyl acrylate, isobornyl acrylate, etc.; aminoalkyl acrylates such as diethylaminoethyl acrylate; cyanoalkyl acrylates such as cyanoethyl acrylate, cyanopropyl acrylate, etc.; carbamoyloxy alkyl acrylates such as 2-carbamoyloxyethyl acrylate, 2-carbamoyl-oxypropyl acrylate, N-methylcarbamoyloxyethyl acrylate, N-ethylcarbamoyloxymetyl acrylate, 2-(N-methylcarbamoyloxy)-ethyl acrylate, and 2-(N-ethylcarbamoyloxy)ethyl acrylate, etc. The lactone-acrylate adduct or the mono-isocyanate capped lactone-acrylate adduct may also be used as the reactive solvent.

Also, multi-functional alkyl acrylates may be used such as 1,6-hexanediol diacrylate, neopentyl glycol diacrylate, tetraethyleneglycol diacrylate, esterdiol-204-diacrylate, trimethylolpropane triacrylate, triethyleneglycol diacrylate, the diacrylate of alkoxylated esterdiol 204, such as the 4 mole ethylene oxide adduct of esterdiol 204, the lactone-acrylate adduct reacted with a multi-functional isocyanate, may be used. Also, N-vinyl pyrrolidone may be used. Further, acrylated oils such as the reaction product of epoxidized soybean oil and/or linseed oil and acrylic acid may be used.

The concentration of reactive solvent in the radiation curable coating composition can be from zero to about 70 weight percent, preferably from about 5 to about 50 weight percent. The concentration used is selected so as to obtain the desired application viscosity in the coating composition.

Conventional solvents include cyclohexanone, toluene, methyl isobutyl ketone, tetrahydrofuran, methyl amyl ketone, ethoxy ethyl acetate, and the like and mixtures of these solvents such as, for example, a 2:2:1 mixture of methyl isobutyl ketone, toluene and cyclohexanone.

When conventional solvents are used, they are employed at a concentration of from 1 to about 99%, the concentration being dependent on the viscosity needed for proper application or other characteristics. Generally, the conventional or inert solvents will be removed or partially removed by evaporation with or without the use of thermal energy before the radiation cure is effected.

In the compositions of this invention, for each mole of polyol, from 1.25 to 6 moles of multi-functional isocyanate and 0.5 to 8 moles oF hydroxy functional acrylate may be used as the reactants.

The amount of polyol which may be reacted to produce the compositions described herein is widely variable, however, in one embodiment in excess of 20 percent by weight of polyol is reacted based on the total weight of polyol, multifunctional isocyanate, lactone acrylate adduct, and, optionally, hydroxyalkyl acrylate reactants.

The coating composition of this invention can be cured by ionizing or non-ionizing radiation means including, but not limited to, ultraviolet light and electron beam radiation. These curing methods and the equipment that can be used for them are well known to those skilled in the art. When the coating composition is to be cured by non-ionizing radiation, the presence of a photoinitiator therein is desirable. Any of the known photoinitiators can be used. Illustrative of suitable photoinitiators one can mention 2,2-diethyoxyacetophenone, 2- or 3- or 4-bromoacetophenone, 3- or 4-allylacetophenone, 2-acetonaphthone, benzaldehyde, benzoin, the alkyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, thioxanthone, 2-chlorothioxanthone, methylthioxanthone, $\alpha, \alpha, \alpha$, -trichloro para t-butyl acetophenone, 4-methoxybenzophenone, 3-chloro-8-nonylxanthone, 3-iodo-7-methoxyxanthone, benzaldehyde, carbazole, 4-chloro-4'-benzyl-benzophenone, fluorene, fluorenone, 1,4-naphthylphenylketone, 2,3-pentanedione, 2,2-di-sec-butoxy acetophenone, dimethoxyphenyl acetophenone, propiophenone, chlorothioxanthone, xanthone and the like, or any mixtures of these. The foregoing list is meant to be illustrative only and is not meant to exclude any suitable photoinitiators known to those skilled in the art. Those skilled in the art will know the concentrations at which photoinitiators are effectively employed and generally the concentration will not exceed 15 weight percent of the radiation curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexy-lethylenimine, piperidine, N-methylpiperazine, 2,2-dimethyl-1,3-bis(3-N-morpholinyl) propionyloxypropane, and the like, or any combination of these.

The compositions of this invention can also be cured upon exposure to any source of radiation emitting actinic radiation at a wavelength within the ultraviolet and visible spectral regions. Suitable sources of radiation include mercury, xenon, carbon arc lamps, sunlight, etc. Exposures may be from less than about 1 second to 10 minutes or more depending upon the amounts of particular polymerizable materials and photoinitiator being utilized and depending upon the radiation source and distance from the source and the thickness of the coating to be cured. The compositions may also be photopolymerized by exposure to electron beam radiation. Generally speaking the dosage necessary is from less than 1 megarad to 100 megarads or more.

If desired, one may include in the compositions of this invention various conventional non-basic fillers (e.g., silica, talc, glass beads or bubbles, clays, powdered or particulated metal such as aluminum, cobalt, silver, zinc oxide, iron oxide, cobalt oxide, magnetic oxides etc.) and other additives such as viscosity modifiers, rubbers, tackifying agents, pigments, and the like.

The compositions of this invention are particularly suitable in a variety of applications in the fields of protective coatings, as a binder for magnetic particles which are used in magnetic recording medium as described in U.S. patent application Ser. No. (509,390) filed in the name of C. L. Osborn et al., titled Magnetic Recording Medium, on the same date as this application, and graphic arts due to their flexibility, impact resistance, abrasion-resistance, hardness and adhesion to rigid, resilient and flexible substrates such as metal, plastic, rubber, glass, paper, wood and ceramics.

EXAMPLES

The following Examples serve to give specific illustration of the practice of this invention but they are not intended in any way to act to limit the scope of this invention.

The following designations used in the Examples have the following meaning:

Polyol I: a dihydroxyfunctional polycaprolactone polyol with an average hydroxyl number of 212 and an average molecular weight of 530 (TONE-0200 obtained from Union Carbide Corporation).

Preparation of Polyol II

A 500 ml reaction flask was equipped with a stirrer, a thermometer fitted with a temperature controller, a heating mantle, a condenser with gas outlet, and a gas sparging tube. The flask was charged with 35.0 g. of diethylene glycol and 141 g. of caprolactone monomer. The mixture was heated to 130° C. and held there 30 minutes while sparging with nitrogen. A catalyst charge of 0.002 g. of stannous octanoate (0.5 ml of a solution of 0.4 g. of stannous octanoate in 100 ml diethylene glycol) was added and the flask heated to 160° C. over about 30 minutes. Heating was continued about 2.5 hours after the catalyst was added. The reaction was followed by gas chromatography and terminated when the caprolactone concentration decreased to less than 1%. The product had an average molecular weight of 530.

Preparation of Polyol III

The procedure to prepare Polyol II was exactly repeated except that 448 g. of diethylene glycol and 2052 g. of caprolactone monomer were used and the reaction was carried out at 140° C. for 16 hours. The product had an average molecular weight of 830.

Preparation of Polyol IV

The procedure to prepare Polyol II was exactly repeated except that 19.1 grams of 1,4-butanediol and 157.6 g. of caprolactone monomer were used. The product had an average molecular weight of 830.

Preparation of Polyol V

The procedure to prepare Polyol II was exactly repeated except that 594 grams of 1,4-butanediol and 2906 g. of caprolactone monomer were used. The product had an average molecular weight of 530.

Preparation of Polyol VI

The procedure to prepare Polyol II was exactly repeated except that 252 grams of 1,4-butanediol and 3248 g. of caprolactone monomer were used and the reaction was carried out at 160° C. for 3.5 hours. The product had an average molecular weight of 1250.

Preparation of Caprolactone Adduct I

A 50 gallon glass-lined reactor was equipped with a stirrer, temperature control, and nitrogen/air inlet and outlet tubes and used as the reaction vessel. Epsilon-caprolactone was dried by contacting it with molecular sieves. Then, 242 pounds of the dried epsilon-caprolactone and 100 grams of the monomethyl ether of hydroquinone dissolved in a small amount of epsilon-caprolactone were introduced into the reaction vessel and heated to 100° C. while sparging the system with nitrogen. When the temperature reached 100° C., the nitrogen sparge was changed to a nitrogen blanket and an air sparge was started. A mixture of 124 pounds of 2-hydroxyethyl acrylate, and 100 ppm of stannous octanoate was added. The reaction temperature was increased to 125 C. and the reaction mixture was held at this temperature for 12 hours. It was then cooled to room temperature (about 25° C.), and collected as a residue product. The product had a hydroxyl number of 179.2, an acid number of 3.13 a Brookfield viscosity of 76 centipoise (at 25° C.), and a water content of 135 ppm.

Control A

Into a 500 ml. four-necked, round-bottomed flask equipped with an air condenser, mechanical stirrer, dropping funnel, thermometer, heating mantle, and dry air blanket were charged 2 moles of 2-ethylhexyl acrylate, 2 moles of isophorone diisocyanate and dibutyltin dilaurate. The mixture was heated to 55° C. and 2 moles of Polyol I was added dropwise through a dropping funnel. After complete addition of the Polyol I, 2 moles of hydroxyethyl acrylate was added dropwise through the dropping funnel. The reaction mixture was maintained at 55°–60° C.

EXAMPLE 1

Into the equipment described in Control A were placed 150 g. of 2-ethylhexyl acrylate, 129 g. of isophorone diisocyanate, 0.5 g. of dibutyltin dilaurate, and 0.1 g. of 2,6-di-tert-butyl-4-methylphenol. The mixture was heated to 55° C. and 154 g. of Polyol I was added dropwise through a dropping funnel. After complete addition of the Polyol I, 133.5 g. of a mixture of Caprolactone Adduct I (99.8 g.) and 2-hydroxyethyl acrylate (33.7 g.) was added dropwise through the dropping funnel. The reaction mixture was maintained at 55° to 60° C. until the isocyanate level was less than about 0.2 wt. %, as determined by titration with dibutylamine.

EXAMPLE 2

The proce of Example 1 was exactly repeated except that the flask was charged with 150 g. of 1,6 hexanediol diacrylate, 129 g. of isophorone diisocyanate, 0.5 g of dibutyltin dilaurate and 2,6-di-tert-butyl-4-methylphenol, 154 g. of Polyol I were added to the heated mixture. After complete addition of the polyol, 133.5 g. of a mixture of Caprolactone Adduct I (99.8 g.) and 2-hydroxyethyl acrylate (33.7 g.) was added and the procedure as described in Example 1 continued.

EXAMPLE 3

The procedure of Example 1 was exactly repeated except that the flask was charged with 145 g. of 2-ethylhexyl acrylate, 131 g. of isophorone diisocyanate, 0.5 g.

of dibutyltin dilaurate and 2,6-di-tert-butyl-4-methylphenol. 106 g. of Polyol I was added to the heated mixture. After complete addition of the Polyol, 250 g. of a mixture of Caprolactone Adduct I (227 g.) and 2-hydroxyethyl acrylate (23 g.) was added and the procedure as described in Example 1 continued.

EXAMPLE 4

The procedure of Example 1 was exactly repeated except that the flask was charged with 138 g. of 2-ethylhexyl acrylate, 105 g. of toluene diisocyanate, 0.5 g of dibutyltin dilaurate and 2,6-di-tert-butyl-4-methylphenol. 106 g. of Polyol I was added to the heated mixture. After complete addition of the polyol, 250 g. of a mixture of Caprolactone Adduct I (227 g.) and 2-hydroxyethyl acrylate (23 g.) was added and the procedure as described in Example 1 continued.

EXAMPLE 5

The procedure of Example 1 was exactly repeated except that the flask was charged with 177 g. of 2-ethylhexyl acrylate, 110 g. of isophorone diisocyanate, 0.5 g of dibutyltin dilaurate and 2,6-di-tert-butyl-4-methylphenol. 133 g. of Polyol I was added to the heated mixture. After complete addition of the polyol, 172 g. of Caprolactone Adduct I was added and the procedure as described in Example 1 continued.

EXAMPLE 6

The procedure of Example 1 was exactly repeated except that the flask was charged with 145 g. of hexanediol diacrylate, 131 g. of isophorone diisocyanate, 0.5 g of dibutyltin dilaurate and 2,6-di-tert-butyl-4-methylphenol. 106 g. of Polyol I was added to the heated mixture. After complete addition of the polyol, 250 g. of a mixture of Caprolactone Adduct I (227 g.) and 2-hydroxyethyl acrylate (23 g.) was added and the procedure as described in Example 1 continued.

EXAMPLE 7

The procedure of Example 1 was exactly repeated except that the flask was charged with 188 g. of 2-ethylhexyl acrylate, 94 g. of toluene diisocyanate, 0.5 g of dibutyltin dilaurate and 2,6-di-tert-butyl-4-methylphenol. 95 g. of Polyol I was added to the heated mixture. After complete addition of the polyol, 245 g. Caprolactone Adduct I was added and the procedure as described in Example 1 continued.

EXAMPLE 8

The procedure of Example 1 was exactly repeated except that the flask was charged with 128 g. of 2-ethylhexyl acrylate, 110 g. of isophorone diisocyanate, 0.5 g. of dibutyltin dilaurate and 2,6-di-tert-butyl-4-methylphenol, 133 g. of Polyol V was added to the heated mixture. After complete addition of the Polyol V, 58 g. of 2-hydroxyethyl acrylate was added and the procedure as described in Example 1 continued.

EXAMPLE 9

The procedure of Example 1 was exactly repeated except that the flask was charged with 128 g. of 2-ethylhexyl acrylate, 110 g. of isophorone diisocyanate, 0.5 g. of dibutyltin dilaurate and 2,6-di-tert-butyl-4-methylphenol. 133 g. of Polyol II was added to the heated mixture. After complete addition of Polyol II, 58 g. of 2-hydroxyethyl acrylate was added and the procedure as described in Example 1 continued.

EXAMPLE 10

The procedure of Example 1 was exactly repeated except that the flask was charged with 160 g. of 2-ethylhexyl acrylate, 110 g. of isophorone diisocyanate, 0.5 g. of dibutyltin dilaurate and 2,6-di-tert-butyl-4-methylphenol. 208 g. of Polyol IV was added to the heated mixture. After complete addition of Polyol IV, 58 g. of 2-hydroxyethyl acrylate was added and the procedure as described in Example 1 continued.

EXAMPLE 11

The procedure of Example 1 was exactly repeated except that the flask was charged with 165 g. of 2-ethylhexyl acrylate, 88 g. of isophorone diisocyanate, 0.5 g of dibutyltin dilaurate and 2,6-di-tert-butyl-4-methylphenol. 250 g. of Polyol VI was added to the heated mixture. After complete addition of the Polyol VI, 58 g. of 2-hydroxyethyl acrylate was added and the procedure as described in Example 1 continued.

EXAMPLE 12

The procedure of Example 1 was exactly repeated except that the flask was charged with 150 g. of cyclohexanone, 129 g. of isophorone diisocyanate, 0.5 g. of dibutyltin dilaurate and 2,6-di-tert-butyl-4-methylphenol. 154 g. of Polyol I was added to the heated mixture. After complete addition of the polyol, 68 g. of 2-hydroxyethyl acrylate was added and the procedure as described in Example 1 continued.

EXAMPLE 13

The procedure of Example 1 was exactly repeated except that the flask was charged with 146 g. of cyclohexanone, 133 g. of isophorone diisocyanate, 0.5 g. of dibutyltin dilaurate and 2,6-di-tert-butyl-4-methylphenol. 106 g. of Polyol I was added to the heated mixture. After complete addition of the polyol, a mixture of 124 g of Caprolactone Adduct I (101 g.) and hydroxylethyl acrylate (23 g.) was added and the procedure as described in Example 1 continued.

EXAMPLE 14

A glass reactor equipped with a stirrer, thermometer and air inlet and outlet ports was charged with the following ingredients:

TABLE I

| Ingredients | Run A | Run B |
|---|---|---|
| 4,4'-dicyclohexyl-methylene diisocyanate | 450 g | 450 g |
| N—vinyl pyrrolidone | 250 g | — |
| isobornyl acrylate | — | 250 g |
| ethyleneglycol dimethyl acrylate | 250 g | 250 g |
| alloocimene | 1.2 g | 1.2 g |
| dibutytin dilaurate | 1.2 g | 1.7 g |

These ingredients were heated to 61° C. and 497 g. of the Caprolactone Adduct I was added over a half hour period. Then, 463 g. of a mixture containing 65.36% of polyol $X^1$, 33.65% of Polyol $Y^2$, and 0.99% of tributylphosphite, that had been previously dried by heating at 135° C. under a nitrogen sparge for about 2 hours, were added over a one hour period. When this addition was completed, 124 g. of Caprolactone Adduct I was added over a 10 minute period. The temperature was maintained at about 65° to 70° C. during these additions and for the following 2.5 hour reaction period. After this time period, 3.0 g. of the vinyl methyl ether of hydroquinone was added. After the product of Run A and B were cooled to room temperature, the free isocyanate content was determined and found to be 0.14% for Run A and 0.20% for Run B. The residue product of Run A and B had viscosities of 8,460 cps. and 16,220 cps., respectively.

[1] Polyol X is a trifunctional propylene oxide polyol with an average hydroxyl number of 232.5.
[2] Polyol Y is a trifunctional propylene oxide polyol with an average hydroxyl number of 168.5.

PREPARATION OF COATINGS FROM THE COMPOSITIONS OF EXAMPLES 1–13 AND CONTROL A.

In each case, approximately one weight percent of 2,2-dimethoxy-2-phenylacetophonone (Irgacure 651, obtained from Ciba-Geigy) was added to the coating prior to UV cure. The liquid coatings were applied to a silicon release paper using the appropriate wire-wound rod to yield a cured film, 1–10 mil. thick. The applied coatings were cured with a Linde DBHG 3-M Curing Unit with a delivered flux of 500 watts/inch squared at a line speed of 25 fpm. In some cases, it was necessary to cure the film on both sides to obtain adequate through-cure. All samples were cured under a nitrogen blanket.

After cure, the film was removed from the release paper and mechanical film properties were measured.

The table shows the tensile strength (psi) and elongation (percent) of the cured coating and the Brookfield viscosity (cps) at 25° C. of the composition.

TABLE II

| EXAMPLE | TENSILE STRENGTH | ELONGATION | VISCOSITY |
|---|---|---|---|
| Control A | 1000 | 65 | 3200 |
| 1 | 670 | 100 | 2230 |
| 2 | 3690 | 30 | 3800 |
| 3 | 1115 | 55 | 1075 |
| 4 | 850 | 90 | 1310 |
| 5 | 405 | 55 | 1135 |
| 6 | 4200 | 10 | 1350 |
| 7 | 335 | 30 | 670 |
| 8 | 1050 | 75 | 2190 |
| 9 | 1125 | 85 | 1970 |
| 10 | 425 | 55 | 1725 |
| 11 | 295 | 60 | 1975 |
| 12 | 1000 | 66 | 1835 |
| 13 | 410 | 50 | 965 |

The Table shows that the properties are typical and it is realized by those skilled in the art by following the teachings of this disclosure that the properties can be altered by selection and amount of the reactive solvent used and the other additives.

COMPARATIVE EXAMPLE C₁

Into a one-liter, four-necked reaction flask equipped with a stirrer, thermometer, air inlet/outlet and feeding tank were charged 226.25 grams of epsilon-caprolactone, 2.35 grams of paramethoxyphenol, and 0.40 grams of Tinuvin P. The ingredients were heated to a temperature of about 120° C. Thereafter, 232.0 grams of hydroxyethyl acrylate, 0.24 grams of stannous octanoate and 0.53 grams of dibutyltin dilaurate, were added to the reaction flask and the temperature thereof was maintained at 120° C. for nine hours. The reaction product had an acid number of 3.0 and a hydroxyl number of 241, and was easily poured and handled.

A lactone derived resin was made by blending 240.5 grams of the above prepared reaction product, 20.1 grams of trimethylol propane, and 141.8 grams of toluene diisocyanate in a one-liter flask as described above.

The mixture was heated to a temperature of 100° C. Following heating the reaction product was allowed to cool to a temperature of 65° C., at which time 5.0 grams of dibutyltin dilaurate were added thereto and the resultant composition was held at a temperature of 65° C. for a period of two hours, after which time it was heated to a temperature of 95° C. at which temperature it was maintained for two hours. The final product had an acid number of 5.3 and a hydroxyl value of 22.4. The product was a viscous material which was not easily pourable at room temperature. The viscosity of the product was not measurable with a Brookfield viscosity at 25° C.

A coating was made from the above prepared lactone derived resin by the following procedure:

Twenty grams of the lactone derived resin was combined with ten grams of cyclohexanone, 0.20 grams of Irgacure 651 and 0.15 grams of a surfactant. The solution was coated onto release paper and dried to remove the cyclohexanone. The tensile properties of two replicate specimens were as follows:

| Specimen | Thickness Mils | Tensile Strength PSI | Elongation % |
|---|---|---|---|
| S₁ | 6.1 | 6361 | 5 |
| S₂ | 7.7 | 4623 | 6 |

What is claimed is:

1. A composition suitable for use as a radiation curable coating comprising the reaction product of a polycaprolactone polyol, a multi-functional isocyanate, and a lactone-acrylate adduct.

2. A composition as defined in claim 1 wherein the reaction product contains an hydroxyalkyl acrylate.

3. A composition as defined in claim 1 wherein the multi-functional isocyanate is selected from 2,4-tolylene diisocyanate, 2,6-tolylene diisocyanate, isophorone diisocyanate, 4,4'-diphenylmethane diisocyanate, di(2-isocyanathoethyl)-bicyclo (2.2.1) hept-5-ene-2,3-dicarboxylate, 3,5,5-tri-ethyl-1-isocyanato-3-isocyanatomethylcyclohexane, 1,6-hexamethylene diisocyanate, m-and p-xylene diisocyanate, cyclohexane-1,4-diisocyanate, 4,4'-dicyclohexyl methane diisocyanate, tetramethylene diisocyanate, cyclopentylene-1,3- diisocyanate, 1,3-diisocyanate, 1,4-xylene diisocyanate, 1,5-naphthalene diisocyanate, m-phenylene diisocyanate, p-phenylene diisocyanate, hexamethylene diisocyanate, 3,3'-dimethyl -4,4'-diphenylmethane diisocyanate, 4,4'-diphenylene diisocyanate, 3,3'-dimethoxy-4,4'-dimethyl-4,4'-biphenylene diisocyanate, durene diisocyanate, 1-phenoxy-2,4-phenylene diisocyanate, 1-tert-butyl-2,4-phenylene diisocyanate, 2,2,4-trimethylhexamethylene diisocyanate, 1,3,5-benzene triisocyanate, 2,4,6-toluene triisocyanate, or mixtures thereof.

4. A composition as defined in claim 1 wherein the lactone-acrylate adduct is prepared by reacting a lactone with an hydroxyalkyl acrylate.

5. A composition as defined in claim 4 wherein the lactone is characterized by the following formula:

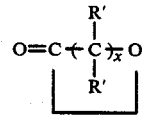

wherein the R"s are independently hydrogen or alkyl of from 1 to 12 carbon atoms, and x is from 4 to 7.

6. A composition as defined in claim 5 wherein the lactone is epsilon-carprolactone.

7. A composition as defined in claim 4 wherein the hydroxyalkyl acrylate is selected from 2-hydroxyethyl acrylate, hydroxypropyl acrylate, hydroxybutyl acrylate, 2-hydroxy-3-chloropropylacrylate, 2,3-dihydroxy propyl acrylate, or mixtures thereof.

8. A composition as defined in claim 7 wherein the hydroxyalkyl acrylate is hydroxyethyl acrylate.

9. A composition as defined in claim 2 wherein the hydroxyalkyl acrylate is as defined in claim 7.

10. A composition as defined in claim 1 which contains a reactive solvent.

11. A composition as defined in claim 10 wherein the reactive solvent is of the following formula:

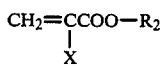

wherein X is hydrogen or methyl and $R_2$ can be substituted or unsubstituted alkyl, cycloalkyl, alkenyl, aryl, or aralkyl, wherein the substituent can be alkoxy, hydroxy, cyano, or amino, or $R_2$ can be carbamoyloxy alkyl which can be N-alkyl substituted.

12. A composition as defined in claim 10 wherein the reactive solvent is a multi-functional alkyl acrylate.

13. A composition as defined in claim 12 wherein the reactive solvent is 1,6-hexanediol diacrylate, neopentyl glycol diacrylate, tetramethyleneglycol diacrylate, esterdiol-204-diacrylate, trimethylolpropane triacylate, triethyleneglycol diacrylate, the diacrylate of an alkoxylated esterdiol 204, or mixtures thereof.

14. A composition as defined in claim 10 wherein the reactive solvent is N-vinylpyrrolidone.

15. A composition as defined in claim 12 wherein the reactive solvent is a lactone-acrylate adduct reacted with a multi-functional isocyanate.

16. A composition as defined in claim 1 which contains a non-reactive solvent.

17. A composition as defined in claim 16 wherein the solvent is cyclohexanone, toluene, methyl isobutyl ketone, tetrahydrofuran, methyl amyl ketone, ethoxy ethyl acetate, and mixtures thereof.

18. A cured coating prepared from the composition of claim 1 or 10 or 16.

19. A composition suitable for use as a radiation curable coating comprising the reaction product of (a) a polycaprolactone polyol; (b) a multifunctional isocyanate; and (c) a lactone-acrylate adduct wherein in excess of 20 percent by weight of component (a), based on the total weight of components (a), (b) and (c), is reacted.

20. A composition suitable for use as a radiation curable coating comprising the reaction product of (a) a polycaprolactone polyol; (b) a multifunctional isocyanate; (c) a lactone-acrylate adduct; and (d) an hydroxyalkyl acrylate wherein in excess of 20 percent by weight of component (a), based on the total weight of components (a), (b), (c) and (d) is reacted.

21. A composition as defined in claim 20 which contains a reactive solvent.

22. A composition as defined in claim 20 which contains a non-reactive solvent.

23. A composition as defined in claim 19 which contains a reactive solvent.

24. A composition as defined in claim 19 which contains a non-reactive solvent.

25. A composition as defined in claim 1 wherein said isocyanate is reacted with said polyol, followed by the reaction of that product with said lactone-acrylate adduct.

26. A composition as defined in claim 2 wherein said isocyanate is reacted with said polyol, followed by the reaction of that product with the lactone-acrylate adduct and said hydroxylalkyl acrylate.

27. A composition as defined in claim 19 wherein said isocyanate is reacted with said polyol, followed by the reaction of that product with said lactone-acrylate adduct.

28. A composition as defined in claim 20 wherein said isocynate is reacted with said polyol, followed by the reaction of that product with said lactone-acrylate adduct.

* * * * *

UNITED STATES PATENT AND TRADEMARK OFFICE
CERTIFICATE OF CORRECTION

PATENT NO. : 4,618,635
DATED : October 21, 1986
INVENTOR(S) : Osborn et al.

It is certified that error appears in the above-identified patent and that said Letters Patent is hereby corrected as shown below:

Column 8, line 15,: change " < " to -- > -- both occurences.

Column 8, line 61,: change "Preferably" to -- preferably --.

Column 9, line 5,: change "is" to -- if --.

Column 9. line 9,: change "ar" to -- are --.

Column 9, line 44,: change "alxyl" to -- alkyl --.

Signed and Sealed this

Twenty-second Day of August, 1989

Attest:

DONALD J. QUIGG

Attesting Officer

Commissioner of Patents and Trademarks